US012679417B2

(12) United States Patent
Gyllenhammar et al.

(10) Patent No.: US 12,679,417 B2
(45) Date of Patent: Jul. 14, 2026

(54) ASSESSMENT OF A VEHICLE CONTROL SYSTEM

(71) Applicant: Zenuity AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: Zenseact AB, Gothenburg (SE)

( * ) Notice: Subject to any disclaimer, the term of this patent is extended or adjusted under 35 U.S.C. 154(b) by 309 days.

(21) Appl. No.: 17/337,121

(22) Filed: Jun. 2, 2021

(65) Prior Publication Data

US 2021/0394794 A1     Dec. 23, 2021

(30) Foreign Application Priority Data

Jun. 22, 2020     (EP) ..................................... 20181332

(51) Int. Cl.
*B60W 60/00*          (2020.01)
*B60W 40/10*          (2012.01)

(52) U.S. Cl.
CPC ........ *B60W 60/0018* (2020.02); *B60W 40/10* (2013.01); *B60W 2520/06* (2013.01);
(Continued)

(58) Field of Classification Search
CPC ............. B60W 60/0018; B60W 40/10; B60W 2520/06; B60W 2554/4041;
(Continued)

(56) References Cited

U.S. PATENT DOCUMENTS 8,954,217 B1 *    2/2015   Montemerlo ....... B60W 30/182
                                                                  701/411
9,315,178 B1      4/2016   Ferguson et al.
                           (Continued)

FOREIGN PATENT DOCUMENTS

WO       WO 02055356       *   7/2002   ............... G05B 9/03
WO       WO-02055356 A1 *     7/2002   ............... G05B 9/03
                           (Continued)

OTHER PUBLICATIONS

Espacnet translation of WO 02055356 (Year: 2002).*
(Continued)

*Primary Examiner* — Joan T Goodbody
(74) *Attorney, Agent, or Firm* — Weisberg I.P. Law, P.A.

(57)          ABSTRACT
The present disclosure relates to a method performed by a trajectory monitoring system of a vehicle for assessment of a vehicle control system of an advanced driver-assistance system, ADAS, or autonomous driving, AD, system of the vehicle. The trajectory monitoring system determines in view of a reference system a planned vehicle trajectory adapted to be executed by the vehicle control system during a predeterminable time period (T). The trajectory monitoring system furthermore determines following initiation and/ or completion of the time period, an actual vehicle trajectory of the vehicle during the time period in view of the reference system. Moreover, the trajectory monitoring system determines an accuracy deviation measure indicating deviation between the actual vehicle trajectory and the planned vehicle trajectory. The trajectory monitoring system further communicates acknowledgment data indicative of the accuracy deviation measure.

15 Claims, 3 Drawing Sheets

1 Trajectory monitoring system

101 Planned trajectory determining unit

102 Actual trajectory determining unit

103 Deviation determining unit

104 Acknowledgment com. unit

105 Further ack. communicating unit

106 CPU

107 Memory

108 Node

21 ADAS/AD system

211 Vehicle control system

22 ADAS/ADS control system

23 User interface 8, 80

(52) U.S. Cl.
CPC . *B60W 2554/4041* (2020.02); *B60W 2556/45* (2020.02); *B60W 2756/10* (2020.02)

(58) Field of Classification Search
CPC ......... B60W 2556/45; B60W 2756/10; B60W 2050/046; B60W 2556/55; B60W 50/045; B60W 50/0205

See application file for complete search history.

(56) References Cited

U.S. PATENT DOCUMENTS

| | | | |
|---|---|---|---|
| 2019/0064823 A1* | 2/2019 | Jiang .................... | G05D 1/0212 |
| 2020/0039528 A1 | 2/2020 | Ewert | |

FOREIGN PATENT DOCUMENTS

| | | | | | |
|---|---|---|---|---|---|
| WO | WO 2017079301 | * | 5/2017 | ............ | G01S 15/86 |
| WO | WO-2017079301 A1 | * | 5/2017 | ............ | G01S 15/86 |
| WO | WO2020079698 | * | 4/2020 | ........... | G01S 13/865 |

OTHER PUBLICATIONS

S. Wei, P. E. Pfeffer and J. Edelmann, "State of the Art: Ongoing Research in Assessment Methods for Lane Keeping Assistance Systems," in IEEE Transactions on Intelligent Vehicles. 2023 (Year: 2023).*

A. Reschka, J. R. Böhmer, T. Nothdurft, P. Hecker, B. Lichte and M. Maurer, "A surveillance and safety system based on performance criteria and functional degradation for an autonomous vehicle," 2012 15th Int. IEEE Conference on Intelligent Transport . . . Systems, Anchorage, AK, USA, 2012, pp. 237-242. (Year: 2012).*

Muhammad Sualeh and Gon-Woo Kim "Dynamic Multi-LiDAR based multiple Object Detection and Tracking," Sensors 2019, 19, 14 (Year: 2019).*

Of Muhammad Sualeh and Gon-Woo Kim "Dynamic Multi-LiDAR based multiple Object Detection and Tracking," Sensors 2019, 19, 1474. (Year: 2019).*

A. Reschka, J. R. Böhmer, T. Nothdurft, P. Hecker, B. Lichte and M. Maurer, "A surveillance and safety system based on performance criteria and functional degradation for an autonomous vehicle," 2012 15th International IEEE Conference on Int.Transpor. Systems, Anchorage, AK, USA, 2012, pp. (Year: 2012).*

B. Thomas, J. Lowenau, S. Durekovic, M. Landwehr and M. Flament, "Test Results and Validation of the FeedMAP Framework with ADAS Applications," 2008 11th International IEEE Conference on Intelligent Transportation Systems, Beijing, China, 2008, pp. 240-246 (Year: 2008).*

F. Biral, R. Antonello, E. Bertolazzi and F. Zendri, "Integration of optimal maneuver prediction in active safety control systems: considerations on driving safety improvements," 2010 IEEE International Conference on Control Applications, Yokohama, Japan, 2010, pp. 173-178. (Year: 2010).*

Muhammad Sualeh and Gon-Woo Kim "Dynamic Multi-LiDAR based multiple Object Detection and Tracking," Sensors 2019, 19, 1474. (Year: 2019).*

European Search Report dated Dec. 9, 2020 for International Application No. 20181332.6 filed on Jun. 22, 2020, consisting of 9-pages.

Comparison of Trajectory Tracking Controllers For Emergency Situations; Daniel Heb et al; 2013 IEEE Intelligent Vehicles Symposium (iv), IEEE, Jun. 23, 2013, p. 163-170, XP032501964; consisting of 8 pages.

Chinese Office Action and English Translation dated Jul. 2, 2025 for Application No. 202110681448.4, consisting of 16 pages.

* cited by examiner

ASSESSMENT OF A VEHICLE CONTROL SYSTEM

TECHNICAL FIELD

The present disclosure relates to assessment of a vehicle control system of an advanced driver-assistance system, ADAS, or autonomous driving, AD, system of a vehicle.

BACKGROUND

An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. To function as intended, ADAS may rely on inputs from multiple data sources, such as e.g. LIDARs, radars, ultrasonics, cameras, automotive imaging, image processing, computer vision, and/or in-car networking.

Moreover, in a not too distant future, autonomous or automated driving systems, AD systems, will to greater extent find their way into modern vehicles. An AD system is a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all responsibilities to the system. An AD system commonly combines a variety of sensors to perceive the vehicle's surroundings, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

ADAS and/or AD systems as described above are, however, bound to be required to function with a high integrity to provide sufficiently low risk for the vehicle user(s) as well as other traffic participants. Ensuring that the risk is sufficiently low may require intractable amounts of data for statistical proofs, and would—according to an example—take e.g., approximately a hundred vehicles to drive continuously for five centuries, to acquire. There are several approaches to minimize the risk of the ADAS and/or AD systems before they are launched onto public roads. However, on top of this, it is generally believed that the ADAS and/or AD systems should be monitored once on public roads, to ascertain the safety and/or performance of said ADAS and/or AD systems, and/or for validation thereof.

SUMMARY OF THE INVENTION

It is therefore an object of embodiments herein to provide an approach for in an improved and/or alternative manner enabling for a vehicle control system of an ADAS or AD system to be assessed while the ADAS or AD system is operating, e.g., on public roads.

The object above may be achieved by the subject-matter disclosed herein. Embodiments are set forth in the appended claims, in the following description and in the drawings.

The disclosed subject-matter relates to a method performed by a trajectory monitoring system of a vehicle for assessment of a vehicle control system of an advanced driver-assistance system, ADAS, or autonomous driving, AD, system of the vehicle. The trajectory monitoring system determines in view of a reference system a planned vehicle trajectory adapted to be executed by the vehicle control system during a predeterminable time period. The trajectory monitoring system further determines, following initiation and/or completion of the time period, an actual vehicle trajectory of the vehicle during the time period in view of the reference system. Moreover, the trajectory monitoring system determines an accuracy deviation measure indicating deviation between the actual vehicle trajectory and the planned vehicle trajectory. The trajectory monitoring system furthermore communicates acknowledgment data indicative of the accuracy deviation measure.

The disclosed subject-matter further relates to a trajectory monitoring system of a vehicle for assessment of a vehicle control system of an advanced driver-assistance system, ADAS, or autonomous driving, AD, system of the vehicle. The trajectory monitoring system comprises a planned trajectory determining unit for—and/or adapted for—determining in view of a reference system a planned vehicle trajectory adapted to be executed by the vehicle control system during a predeterminable time period. The trajectory monitoring system furthermore comprises an actual trajectory determining unit for—and/or adapted for—determining, following initiation and/or completion of the time period, an actual vehicle trajectory of the vehicle during the time period in view of the reference system. Moreover, the trajectory monitoring system comprises a deviation determining unit for—and/or adapted for—determining an accuracy deviation measure indicating deviation between the actual vehicle trajectory and the planned vehicle trajectory. The trajectory monitoring system further comprises an acknowledgment communicating unit for—and/or adapted for—communicating acknowledgment data indicative of the accuracy deviation measure.

Furthermore, the disclosed subject-matter relates to a vehicle comprising a trajectory monitoring system as described herein.

Moreover, the disclosed subject-matter relates to a computer program product comprising a computer program containing computer program code means arranged to cause a computer or a processor to execute the steps of a trajectory monitoring system described herein, stored on a computer-readable medium or a carrier wave.

The disclosed subject-matter further relates to a non-volatile computer readable storage medium having stored thereon said computer program product.

Thereby, there is introduced an approach according to which vehicle control actuations of an ADAS or AD system of a vehicle may be monitored for performance, safety and/or validation while the ADAS or AD system is operating. That is, since there is determined in view of a reference system a planned vehicle trajectory adapted to be executed by the vehicle control system during a predeterminable time period, there is mapped an upcoming intended vehicle trajectory to a reference system—such as a coordinate system and/or digital map—applicable for the vehicle and/or the intended vehicle trajectory. Moreover, that is, since there is determined, following initiation and/or completion of the time period, an actual vehicle trajectory of the vehicle during the time period in view of the reference system, in addition to the already mapped planned vehicle trajectory, the enacted vehicle trajectory is additionally mapped to the reference system. Furthermore, that is, since there is determined an accuracy deviation measure indicating deviation between the actual vehicle trajectory and the planned vehicle trajectory, there is identified in view of the reference system, one or more discrepancies between the true vehicle trajectory and the intended vehicle trajectory, which for instance may result from faulty estimations of road geometries—such as due to potholes and/or banking—and/or result from internal errors—e.g. in control loops—of the vehicle control system. Furthermore, that is, since there is communicated acknowledgment data indicative of the accuracy deviation measure, data relating to the determined accuracy deviation measure is communicated from the trajectory monitoring system. Accordingly, the trajectory monitoring system brings attention to discrepancies between the planned vehicle trajectory and the actual vehicle trajectory, in that data indicative thereof, may be communicated to relevant systems and/or entities on- or off-board the vehicle For that reason, an approach is provided for in an improved and/or alternative manner enabling for a vehicle control system of an ADAS or AD system to be assessed while the ADAS or AD system is operating, e.g., on public roads.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
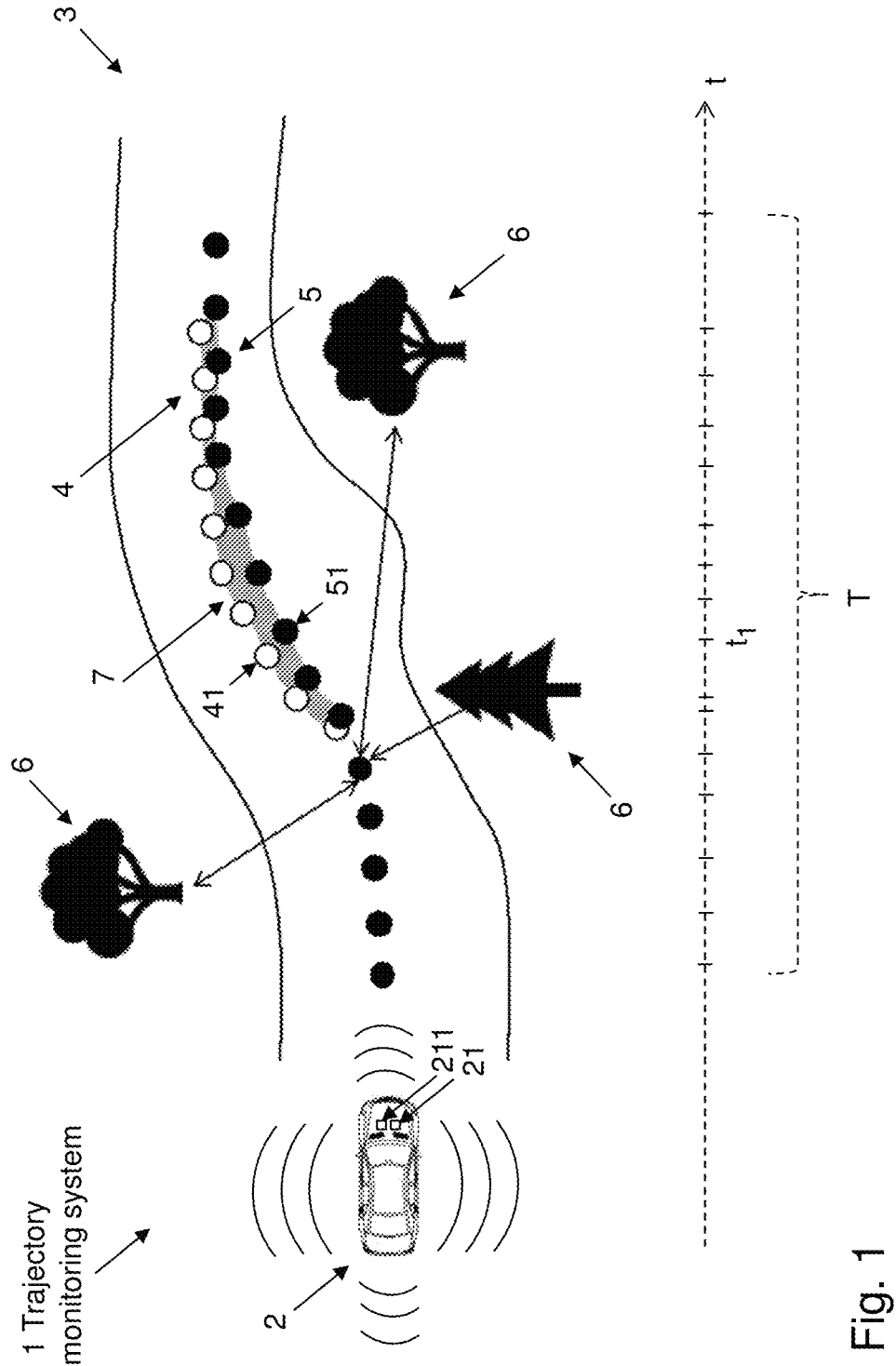
FIG. 1 illustrates a schematic view of an exemplifying trajectory monitoring system of a vehicle according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in any different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to assessment of a vehicle control system of an ADAS or AD system of a vehicle, there will be disclosed an approach according to which vehicle control actuations of the ADAS or AD system may be monitored for performance, safety and/or validation while the ADAS or AD system is operating.

Figure 2:
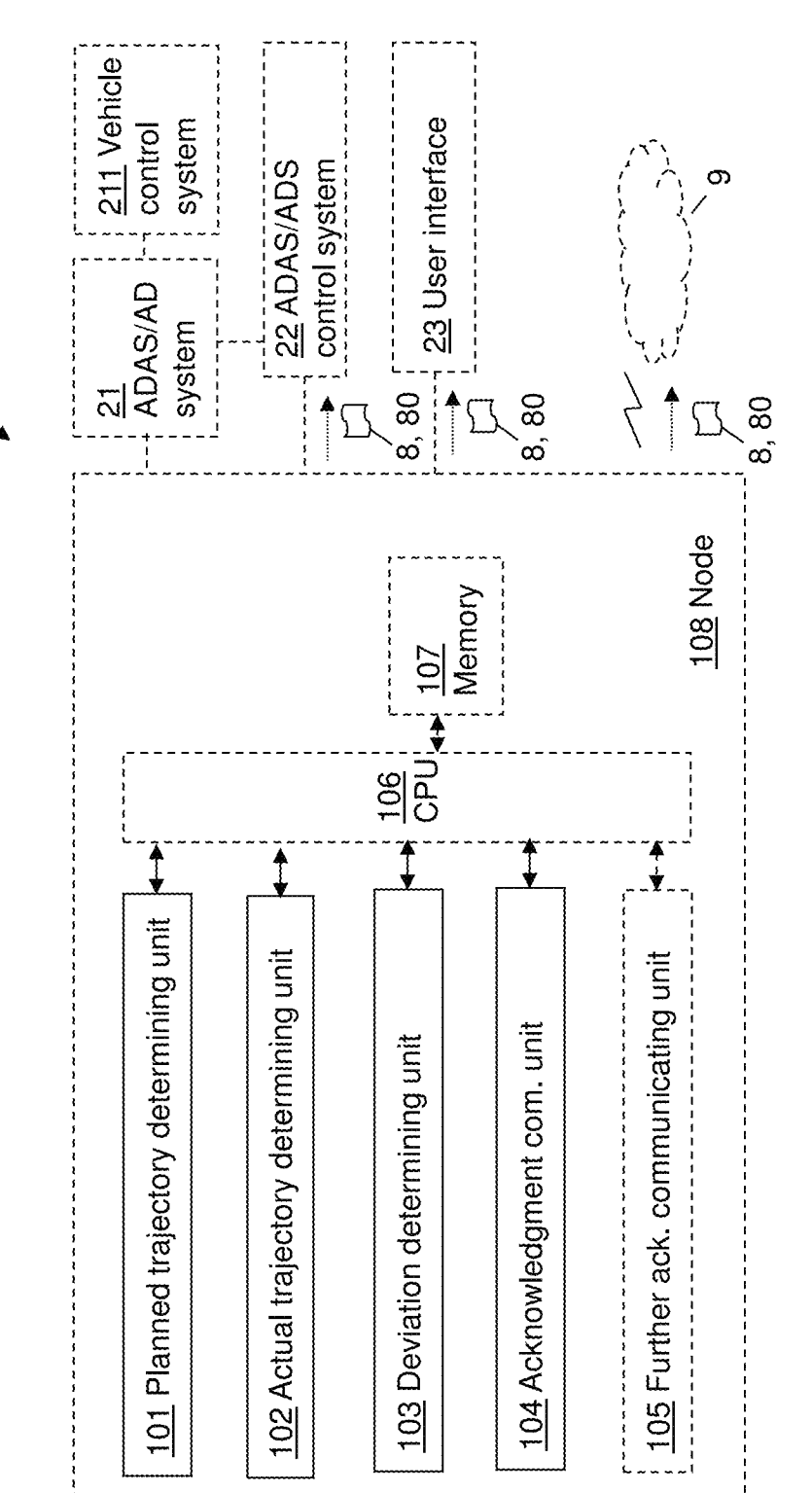
FIG. 2 is a schematic block diagram illustrating an exemplifying trajectory monitoring system according to embodiments of the disclosure.

Referring now to the figures, there is depicted in FIG. 1 a schematic view of an exemplifying trajectory monitoring system 1 of a vehicle 2 according to embodiments of the disclosure, and in FIG. 2 a schematic block diagram illustrating an exemplifying trajectory monitoring system 1 according to embodiments of the disclosure. The trajectory monitoring system 1 is adapted for assessment of a vehicle control system 211 of an advanced driver-assistance system, ADAS, or autonomous driving, AD, system 21 of the vehicle 2. The trajectory monitoring system 1 may optionally be comprised in the ADAS or AD system 21, and/or be provided in association and/or connection therewith 21.

The exemplifying vehicle 2 may be represented by any arbitrary—e.g., known—manned or unmanned vehicle, for instance an engine-propelled or electrically-powered vehicle such as a car, truck, lorry, van, bus and/or tractor. Moreover, the term "vehicle" may refer to "launched vehicle", "road-traffic vehicle", "public road vehicle" and/or "production vehicle", and further to "autonomous and/or at least partly autonomous vehicle", "driverless and/or at least partly driverless vehicle", and/or "self-driving and/or at least partly self-driving vehicle". The exemplifying ADAS or AD system 21 may be represented by any arbitrary ADAS or AD system e.g., known in the art and/or yet to be developed. The vehicle control system 211, on the other hand, may be represented by any arbitrary—e.g., known—system and/or component incorporating SW and/or HW actuators e.g. relating to steering, torque, throttle, breaking etc. of the vehicle 2, adapted for executing a planned vehicle trajectory of the ADAS or AD system 21, for instance planned by a—e.g. known—decision control system (not shown) of the ADAS or AD system 21.

The phrase "trajectory monitoring system" may refer to "vehicle trajectory monitoring system", "path monitoring system", "public road monitoring system", "vehicle control assessment system" and/or "trajectory assessment system", whereas "of" a vehicle may refer to "comprised in" a vehicle and/or "on-board" a vehicle. "For" assessment of a vehicle control system, on the other hand, may refer to "adapted for" assessment of a vehicle control system, whereas "for assessment of a vehicle control system" may refer to "for monitoring and evaluation of a vehicle control system", "for performance and/or safety monitoring and/or validation of a vehicle control system" and/or "for assessment of a planned vehicle trajectory". The phrase "a vehicle control system" may refer to "a vehicle control component", "vehicle control block" and/or "vehicle control actuations". According to an example, the phrase "for assessment of a vehicle control system" of an ADAS or AD system may refer to "for assessment of a vehicle control system, and potential further evaluation and/or intervention" of an ADAS or AD system.

The trajectory monitoring system 1 is—e.g. by means of a planned trajectory determining unit 101—adapted and/or configured for determining in view of a reference system 3 a planned vehicle trajectory 4 adapted to be executed by the vehicle control system 211 during a predeterminable time period T. Thereby, there is mapped an upcoming intended vehicle trajectory 4 to a reference system 3—such as a coordinate system and/or digital map—applicable for the vehicle 2 and/or said intended vehicle trajectory 4.

Determining the planned vehicle trajectory 4 may be accomplished in any arbitrary—e.g., known—manner, e.g., with input and/or support from an optional decision control system of the ADAS or AD system 21. The reference system 3, on the other hand, to which the planned trajectory 4 is mapped, may be represented by any arbitrary—e.g., known—reference system, such as a coordinate system and/or a digital map e.g., a commonly known high definition, HD, map or equivalent or successor thereof. Moreover, the planned vehicle trajectory 4 may be represented by any arbitrary feasible vehicle trajectory, having any arbitrary feasible characteristics. Similarly, the predeterminable time T during which the planned vehicle trajectory 4 is intended to be executed, may be of any arbitrary duration, for instance ranging from a few seconds up to tens of seconds or even tens of minutes or hours. The planned vehicle trajectory 4 may be intended to be executed—i.e., the time period T may be intended to be initiated—at any arbitrary point in time, such as within milliseconds or up to tens of seconds from determination of the planned vehicle trajectory 4.

The phrase "determining in view of a reference system a planned vehicle trajectory" may refer to "determining in relation to a reference system a planned vehicle trajectory" and/or "determining and mapping in a reference system a planned vehicle trajectory", and according to an example further to "receiving and determining in view of a reference system a planned vehicle trajectory". Moreover, "a reference system" may refer to "a coordinate system", "an ego-vehicle coordinate system", "one or more reference points and/or marks" and/or "one or more—static and/or dynamic—reference points and/or marks", and according to an example further to "a digital map such as a high definition, HD, map". Furthermore, the phrase "determining [ . . . ] a planned vehicle trajectory" may refer to "calculating and/or deriving [ . . . ] a planned vehicle trajectory", whereas "planned vehicle trajectory" throughout this disclosure may refer to "intended vehicle trajectory", "desired vehicle trajectory" and/or merely "vehicle trajectory" or even "trajectory". Moreover, the phrase "vehicle trajectory" may refer to "driving trajectory", and according to an example further to "vehicle path". The phrase "planned vehicle trajectory adapted to be executed by said vehicle control system", on the other hand, may refer to "planned vehicle trajectory to be executed by said vehicle control system" and/or "planned vehicle trajectory adapted to be implemented by said vehicle control system". Furthermore, the phrase "to be executed by said vehicle control system during a predeterminable time period" may refer to "to be executed by said vehicle control system during a predeterminable upcoming and/or future time period", and according to an example further to merely "to be executed by said vehicle control system".

The trajectory monitoring system 1 is—e.g., by means of an actual trajectory determining unit 102—adapted and/or configured for determining, following initiation and/or completion of the time period T, an actual vehicle trajectory 5 of the vehicle 2 during the time period T in view of the reference system 3. Thereby, in addition to the already mapped planned vehicle trajectory 4, the enacted vehicle trajectory 5 is additionally mapped to the reference system 3.

Determining the actual vehicle trajectory 5 in relation to the reference system 3 may be accomplished in any arbitrary feasible manner, such as with support from one or more—e.g., known—accelerators on-board the vehicle 2 in combination with derived vehicle speed data of the vehicle 2. Additionally or alternatively, however, should the reference system 3 be represented by and/or comprise a digital map, then the actual vehicle trajectory 5 may be determined in relation to said digital map with support from an on-board vehicle perception system (not shown) adapted to estimate surroundings and/or a world view of surroundings of the vehicle 2. That is, the vehicle 2 and/or the ADAS or AD system 21 may comprise and/or be provided with a perception system adapted to estimate surroundings of the vehicle 2 and subsequently adapted to estimate world views of the surroundings with support from a commonly known digital map such as an HD map or a an equivalent or successor thereof. Such an optional perception system may refer to any commonly known system and/or functionality, e.g. comprised in one or more electronic control modules and/or nodes of the vehicle 2 and/or ADAS or AD system 21, adapted and/or configured to interpret sensory information—relevant for driving of the vehicle 2—to identify e.g. obstacles, vehicle lanes, relevant signage, appropriate navigation paths etc. The exemplifying perception system—which may be adapted to support e.g., sensor fusion, tracking, localization etc.—may thus be adapted to rely on and obtain inputs from multiple data sources, such as automotive imaging, image processing, computer vision, and/or in-car networking, etc., in combination with sensory information. Moreover, such exemplifying sensory information may for instance be derived from one or more optional surrounding detecting sensors (not shown) comprised in and/or provided on-board the vehicle 2. Furthermore, such optional surrounding detecting sensors may be represented by any arbitrary sensors adapted to sense and/or perceive the vehicle's 2 surroundings and/or whereabouts, and may e.g., refer to one or a combination of one or more of radar, LIDAR, sonar, camera, navigation system and/or positioning system e.g., GNSS such as GPS, odometer and/or inertial measurement units. As exemplified in FIG. 1, the vehicle 2 may then with support from the digital map be located in a commonly known manner e.g., relative one or more landmarks 6, and the actual vehicle trajectory 5 subsequently be determined.

The actual vehicle trajectory 5 for the time period T may be determined by deriving vehicle positions continuously and/or intermittently, for instance during run-time and/or essentially run-time, and further for instance during real time and/or essentially real time. Additionally or alternatively, the actual vehicle trajectory 5 may be determined following an arbitrarily selected time delay—such as subsequent a portion of the time period T and/or subsequent completion of the time period T—which may enable for the actual vehicle trajectory 5 to be determined with higher confidence and/or to be smoothen out, in that plural continuously and/or intermittently derived vehicle positions may be taken into account in the determination of the actual vehicle trajectory 5.

The phrase "determining following initiation and/or completion of said time period" may refer to "determining subsequent initiation and/or completion of said time period", whereas "determining [ . . . ] an actual vehicle trajectory" may refer to "deriving [ . . . ] an actual vehicle trajectory" and further to "determining—and logging and/or storing—[ . . . ] an actual vehicle trajectory", where logging and/or storing an actual vehicle trajectory may comprise the actual vehicle trajectory being logged and/or stored digitally and/or electronically e.g., in one or more memories of the trajectory monitoring system. Moreover, "actual vehicle trajectory" may throughout this disclosure refer to "executed vehicle trajectory", "actuated vehicle trajectory", "enacted vehicle trajectory", "true vehicle trajectory", "deemed actual vehicle trajectory" and/or merely "actual trajectory". Moreover, the phrase "actual vehicle trajectory" may refer to "actual driving trajectory", and according to an example further to "actual vehicle path". The phrase "an actual vehicle trajectory of said vehicle during said time period", on the other hand, may refer to "an actual vehicle trajectory of said vehicle essentially during said time period", whereas "in view of said reference system" may refer to "in relation to said reference system". According to an example, the phrase "determining [ . . . ] an actual vehicle trajectory of said vehicle during said time period" may refer to merely "determining [ . . . ] an actual vehicle trajectory of said vehicle". Moreover, the phrase "determining following initiation and/or completion of said time period, an actual vehicle trajectory of said vehicle during said time period in view of said reference system" may according to an example refer to "determining in view of said reference system, an actual vehicle trajectory of said vehicle executed by said vehicle control system based on said planned vehicle trajectory". Furthermore, according to an example, the phrase "determining following initiation and/or completion of said time period, an actual vehicle trajectory of said vehicle during said time period in view of said reference system" may refer to "determining following initiation and/or completion of said time period, with support from a perception system adapted to estimate surroundings and/or a world view of surroundings of said vehicle, an actual vehicle trajectory of said vehicle during said time period in view of said reference system e.g. digital map".

The trajectory monitoring system 1 is—e.g., by means of a deviation determining unit 103—adapted and/or configured for determining an accuracy deviation measure 7 indicating deviation between the actual vehicle trajectory 5 and the planned vehicle trajectory 4. Thereby, there is identified in view of the reference system 3, one or more discrepancies 7 between the true vehicle trajectory 5 and the intended vehicle trajectory 4, which for instance may result from faulty estimations of road geometries—such as due to potholes and/or banking—and/or result from internal errors—e.g., in control loops—of the vehicle control system 211.

Determining the accuracy deviation measure 7 may be accomplished in any arbitrary feasible manner, such as by comparing the—to the reference system 3 mapped—planned vehicle trajectory 4 with the—to said reference system 3 mapped—actual vehicle trajectory 5. Moreover, the accuracy deviation measure 7 may be represented by any arbitrary discrepancy and/or discrepancies between the planned vehicle trajectory 4 and the actual vehicle trajectory 5, and for instance be represented by one or more offsets in a predeterminable direction such as in a lateral and/or longitudinal direction of the reference system 3, one or more absolute offsets and/or—as exemplified in FIG. 1—be represented by a total offset between the planned and actual trajectories 4, 5. Moreover, the accuracy deviation measure 7 may be expressed in any arbitrary metrics and/or units, as deemed appropriate for the implementation at hand.

The phrase "determining an accuracy deviation measure" may refer to "calculating an accuracy deviation measure", and according to an example further to determining—and logging and/or storing—an accuracy deviation measure, where logging and/or storing an accuracy deviation measure may comprise the accuracy deviation measure being logged and/or stored digitally and/or electronically e.g., in one or more memories of the trajectory monitoring system. Moreover, the phrase "determining an accuracy deviation measure indicating deviation between said actual vehicle trajectory and said planned vehicle trajectory" may refer to "determining an accuracy deviation measure indicating deviation between said actual vehicle trajectory and said planned vehicle trajectory in view of said reference system", and further to "determining, based on comparison between said actual vehicle trajectory and said planned vehicle trajectory, an accuracy deviation measure indicating deviation between said actual vehicle trajectory and said planned vehicle trajectory". The phrase "accuracy deviation measure" may throughout the disclosure refer to "accuracy discrepancy measure" and/or "accuracy offset measure", and further merely to "accuracy deviation" and/or "deviation measure". Moreover, "indicating deviation" may refer to "indicative of deviation", "indicating one or more deviations" and/or "reflecting deviation", Optionally, the accuracy deviation measure 7 may be based on comparison of at least a first actual vehicle position 51 of the actual vehicle trajectory 5, at an at least first time point $t_1$, with at least a first planned vehicle position 41 of the planned vehicle trajectory 4 at the at least first time point $t_1$. Thereby, the accuracy deviation measure 7 may comprise plural discrepancies determined by plural comparisons at plural time points between vehicle positions of the planned vehicle trajectory 4 and vehicle positions of the actual vehicle trajectory 5. The one or more time points may be represented by any arbitrary feasible number of time points occurring periodically or non-periodically, and correspondingly, the one or more actual vehicle positions and planned vehicle positions may respectively be represented by any arbitrary feasible number of vehicle positions. It may be noted that in exemplifying FIG. 1, for illustrative purposes, the first time point $t_1$ is depicted to in an exemplifying manner occur somewhat in the middle of the time period T, although it is to be understood that said first time point $t_1$ may occur at any arbitrary time point during the time period T.

The trajectory monitoring system 1 is—e.g., by means of an acknowledgment communicating unit 104—adapted and/or configured for communicating acknowledgment data 8 indicative of the accuracy deviation measure 7. Thereby, data 8 relating to the determined accuracy deviation measure 7 is communicated from the trajectory monitoring system 1. Accordingly, the trajectory monitoring system 1 brings attention to discrepancies 7 between the planned vehicle trajectory 4 and the actual vehicle trajectory 5, in that data 8 indicative thereof 7, may be communicated to relevant systems and/or entities on- or off-board the vehicle 2.

The acknowledgment data 8 may comprise any arbitrary data indicative of the accuracy deviation measure 7. According to an example, however, the acknowledgment data 8 may comprise the actual accuracy deviation measure 7 or a portion thereof, and/or data corresponding thereto. According to a further example, the acknowledgment data 8 may then be communicated to o a remote entity 9, such as an exemplifying back office and or commonly known automotive cloud described in greater detail below, where said accuracy deviation measure 7 e.g., may be collected and further e.g., be used for statistics.

"Communicating" acknowledgment data may refer to "communicating wirelessly and/or by wire" acknowledgment data and/or "communicating in due time and/or when deemed feasible and/or safe" acknowledgment data, whereas "acknowledgment data" may refer to "one or more acknowledgment signals" and/or "an acknowledgment message". Moreover, the phrase "acknowledgment data indicative of said accuracy deviation measure" may refer to "acknowledgment data reflecting, representing and/or comprising at least said accuracy deviation measure".

Optionally, the trajectory monitoring system 1 may—e.g., by means of the acknowledgment communicating unit 104—be adapted and/or configured for communicating the acknowledgment data 8 when at least a portion of the accuracy deviation measure 7 fulfills deviation exceedance criteria. Thereby, the outcome of the determination of the deviation between the actual vehicle trajectory 5 and the planned vehicle trajectory 4, i.e. the accuracy deviation measure 7, is considered in view of one or more discrepancy criteria, and should at least a portion of the accuracy deviation measure 7—e.g. a predeterminable number of vehicle position discrepancies between the planned and actual trajectories 4, 5—fulfill one or more criterion of said one or more discrepancy criteria, then an acknowledgment 8 indicative thereof is transmitted from the trajectory monitoring system 1. Accordingly, the trajectory monitoring system 1 brings attention to when the actual vehicle trajectory 5 deviates from the planned vehicle trajectory 4 to an extent greater than one or more levels and/or thresholds defined by the deviation exceedance criteria, upon which it may be concluded that a potential problem relating to the vehicle control system 211 may be present.

The deviation exceedance criteria may comprise any arbitrary number of different thresholds—which may be set to any arbitrary feasible levels and which further may be variable—and the deviation exceedance criteria may be deemed fulfilled when one or more of said thresholds are exceeded. The one or more thresholds may for instance relate to deviation between the planned vehicle path 4—and/ or one or more planned vehicle positions thereof such as the exemplifying first vehicle position 41 applicable for the first time point $t_1$—and the actual vehicle path 5—and/or one or more actual vehicle positions thereof such as the exemplifying corresponding first vehicle position 51 at the first time point $t_1$—in view of the reference system 3. Said one or more thresholds may further for instance relate to frequency or occurrence of deviation and/or proportion of deviation above a predeterminable level e.g., as compared to below said level, and/or duration of deviation above a predeterminable level. The deviation exceedance criteria may accordingly comprise one or more thresholds which may be considered one by one, and/or in combination. Moreover, threshold levels may further be set with different levels when considered one by one, as compared to when considered in conjunction with one another. Furthermore, thresholds may be set differently and/or threshold levels set with different levels when considered in view of criticality, i.e., taking into consideration how critical the accuracy deviation measure 7 is deemed to be. That is, different thresholds may apply— and/or threshold levels be set differently e.g., relatively lower—for situations deemed critical, such as e.g. relating to closeness to road and/or lane markers, and/or to surrounding objects such as e.g. stationary objects. Criticality and/or deemed criticality of the accuracy deviation measure 7 may for instance be derivable in conjunction with said reference system 3, and/or based on situation context.

The phrase "when [ . . . ] fulfills" may throughout the disclosure refer to "should [ . . . ] fulfill", "provided that [ . . . ] fulfill" and/or "if [ . . . ] fulfill", whereas "at least a portion of said accuracy deviation measure" throughout may refer to "at least a predeterminable portion of said accuracy deviation measure" and/or "at least a predeterminable number and/or portion of discrepancies of said accuracy deviation measure indicating a respective deviation between a planned vehicle position of said planned vehicle path and a corresponding actual vehicle position of said actual vehicle trajectory". The phrase "fulfills deviation exceedance criteria", on the other hand, may refer to "exceeds a predeterminable number and/or portion of deviation thresholds", and according to an example further to "exceeds a deviation threshold". Moreover, the phrase "deviation exceedance criteria" may refer to "discrepancy exceedance criteria", "adherence criteria", "deviation exceedance thresholds", "first deviation exceedance criteria" and/or "predeterminable exceedance criteria", and according to an example further to "a deviation threshold".

Optionally, the trajectory monitoring system 1 may then—e.g., by means of the acknowledgment communicating unit 104—be adapted and/or configured for transmitting the acknowledgment data 8 to a remote entity 9, which acknowledgment data 8 then comprises data reflecting the planned vehicle trajectory 4 and/or the actual vehicle trajectory 5. Thereby, provided that the deviation exceedance criteria are fulfilled, data related to the planned vehicle trajectory 4 and/or the actual vehicle trajectory 5—such as for instance raw sensor data, perception output and/or decision control output associated with said time period T or a portion thereof—may be transmitted to the entity 9 for e.g., offline processing and/or analysis. The timing of transmittal may be arbitrarily selected as deemed feasible, such as e.g., promptly or at a point in time deemed suitable. The latter case may e.g., refer to awaiting a high bandwidth connection to the remote entity 9, such as e.g. a Wifi connection, and/or a wire connection provided via e.g. charging of the vehicle 2.

The entity 9 may refer to any off-board data storage entity—e.g., known—adapted for and/or configured for off-board and/or offline processing and/or analysis, such as e.g. a cloud and/or automotive cloud, cloud network adapted for cloud-based storage, back-end system, back office and/or one or more servers. Moreover, "remote" entity may refer to "off-board" entity and/or "offline" entity. The phrase "said acknowledgment data comprising data reflecting said planned vehicle trajectory and/or said actual vehicle trajectory", on the other hand, may refer to "said acknowledgment data comprising data, raw data and/or buffer data—applicable for at least a portion of said time period—reflecting and/or being associated with said planned vehicle trajectory and/or said actual vehicle trajectory".

Additionally or alternatively, optionally, the trajectory monitoring system 1 may then—e.g. by means of the acknowledgment communicating unit 104—be adapted and/ or configured for transmitting the acknowledgment data 8 to an on-board ADAS/ADS control system 22 adapted to control the ADAS or AD system 21, which acknowledgment data 8 then comprises an indication to at least partly disable the ADAS or AD system 21. Thereby, provided that the deviation exceedance criteria are fulfilled, the ADAS or AD system 21—and/or one or more features and/or components associated therewith—and/or functionality thereof, may be revoked to, at least temporarily, inhibit further activation(s), which for instance may be considered relevant should the deviation exceedance criteria at least partly comprise one or more safety-related thresholds related to assumptions made on operation of the vehicle 2.

The ADAS/ADS control system 22 may throughout the disclosure refer to any commonly known system and/or functionality, e.g., comprised in one or more electronic control modules and/or nodes of the vehicle 2, adapted and/or configured to at least in part control the ADAS or AD system 21. Furthermore, "ADAS/ADS control system" may throughout refer to "ADAS/ADS disablement system" and/ or merely "control system", whereas ADAS/ADS control system adapted to "control" may refer to ADAS/ADS control system adapted to "at least partly control". The phrase "comprising an indication" to at least partly disable, on the other hand, may throughout the disclosure refer to "prompting" to at least partly disable and/or "comprising instructions prompting" to at least partly disable, whereas "indication to at least partly disable" throughout may refer to "indication to in due time at least partly disable" and/or "indication to at least partly disable when deemed feasible and/or safe". Moreover, "disable" the ADAS or ADS system may throughout the disclosure refer to "inhibit" and/or "restrict functionality of" the ADAS or AD system.

Additionally or alternatively, optionally, the trajectory monitoring system 1 may then—e.g. by means of the acknowledgment communicating unit 104—be adapted and/ or configured for transmitting the acknowledgment data 8 to a user interface 23 of the vehicle 2, which acknowledgment data 8 then comprises an indication to present to an occupant of the vehicle 2, information reflecting affected performance of the ADAS or AD system 21 pertinent the accuracy deviation measure 7 and/or fulfillment of the deviation exceedance criteria. Thereby, provided that the deviation exceedance criteria are fulfilled, instructions may be provided to a user interface 23 of the vehicle 2, for instance prompting an occupant of said vehicle 2—such as a driver thereof—to take appropriate action e.g. take over driving of the vehicle 2 from the ADAS or AD system 21, and/or notifying said occupant of affected performance of the ADAS or AD system 21.

The phrase "user interface" may throughout the disclosure refer to "user interface controlling system", and according to an example further to "user interface comprising and/or being associated with one or more displays, speakers and/or tactile interfaces". Moreover, "said acknowledgment data comprising an indication to present" may refer to "said acknowledgment data prompting to present" and/or "said acknowledgment data comprising instructions prompting to present", whereas "indication to present" may refer to "indication to in due time and/or when deemed feasible and/or safe present". Furthermore, the phrase "pertinent said accuracy deviation measure and/or fulfillment of said deviation exceedance criteria" may refer to "resulting from the determination of said accuracy deviation measure and/or fulfillment of said deviation exceedance criteria".

Optionally, the trajectory monitoring system 1 may—e.g., by means of an optional further acknowledgment communicating unit 105—be adapted and/or configured for communicating, when at least a portion of the accuracy deviation measure 7 fulfills further deviation exceedance criteria, further acknowledgment data 80, wherein the deviation exceedance criteria differ from the further deviation exceedance criteria. Thereby, different acknowledgment data 8, 80 may be communicated depending on which criteria and/or thresholds that are fulfilled and/or violated. Accordingly, exceeding the deviation exceedance criteria— upon which the acknowledgment data 8 is communicated— may initiate a first action such as e.g. transmittal of the acknowledgment data 8 to the remote entity 9 as described above, whereas exceeding the further deviation exceedance criteria—upon which the further acknowledgment data 80 is communicated—may initiate a differing second action such as e.g. transmittal of the further acknowledgment data 80 to the ADAS/AD control system 22 as described below. That is, here, the deviation between the actual vehicle trajectory 5 and the planned vehicle trajectory 4—i.e., the accuracy deviation measure 7—is considered in view of additional second criteria e.g., comprising one or more thresholds, and should said second criteria be fulfilled, then a further acknowledgment 80 indicative thereof is transmitted from the trajectory monitoring system 1. Accordingly, the trajectory monitoring system 1 may additionally bring attention to when the actual vehicle trajectory 5 deviates from the planned vehicle trajectory 4 to an extent greater than levels defined by the further deviation exceedance criteria, upon which it may be concluded that a potential problem relating to the vehicle control system 211 may be present which potentially may be more severe as compared to should merely the deviation exceedance criteria and not the further deviation exceedance criteria be fulfilled.

At least to some extent differing from the previously discussed deviation exceedance criteria, the further deviation exceedance criteria may comprise any arbitrary number of different thresholds—which may be set to any arbitrary feasible levels and which further may be variable—and the further deviation exceedance criteria may be deemed fulfilled when one or more of said thresholds are exceeded. The one or more thresholds may for instance relate to deviation between the planned vehicle path 4—and/or one or more planned vehicle positions thereof such as the exemplifying first vehicle position 41 applicable for the first time point $t_1$—and the actual vehicle path 5—and/or one or more actual vehicle positions thereof such as the exemplifying corresponding first vehicle position 51 at the first time point $t_1$—in view of the reference system 3. Said one or more thresholds may further for instance relate to frequency or occurrence of deviation and/or proportion of deviation above a predeterminable level e.g. as compared to below said level, and/or duration of deviation above a predeterminable level. The further deviation exceedance criteria may accordingly comprise one or more thresholds which may be considered one by one, and/or in combination. Moreover, threshold levels may further be set with different levels when considered one by one, as compared to when considered in conjunction with one another.

"Communicating" further acknowledgment data may refer to "communicating wirelessly and/or by wire" further acknowledgment data and/or "communicating in due time and/or when deemed feasible and/or safe" further acknowledgment data, whereas "further acknowledgment data" may refer to "one or more further acknowledgment signals" and/or "a further acknowledgment message". Moreover, the phrase "further acknowledgment data indicative of said accuracy deviation measure" may refer to "further acknowledgment data reflecting, representing and/or comprising at least said accuracy deviation measure". The phrase "fulfills further deviation exceedance criteria", on the other hand, may refer to "exceeds a predeterminable number and/or portion of further deviation thresholds", and according to an example further to "exceeds a further deviation threshold". Moreover, the phrase "further deviation exceedance criteria" may refer to "further discrepancy exceedance criteria", "further adherence criteria", "further deviation exceedance thresholds", "second deviation exceedance criteria", "alternative deviation exceedance criteria", "supplemental deviation exceedance criteria" and/or "predeterminable further exceedance criteria", and according to an example further to "a further deviation threshold". The phrase "said deviation exceedance criteria differing from said further deviation exceedance criteria", on the other hand, may refer to "at least a portion of said deviation exceedance criteria differing from said further deviation exceedance criteria", "at least one criterion of said deviation exceedance criteria differing from said further deviation exceedance criteria" and/or "at least one or more thresholds and/or one or more threshold levels of said deviation exceedance criteria differing from said further deviation exceedance criteria".

Optionally, the trajectory monitoring system 1 may then—e.g., by means of the further acknowledgment communicating unit 105—be adapted and/or configured for transmitting the further acknowledgment data 80 to a remote entity 9, which further acknowledgment data 80 then comprises data reflecting the planned vehicle trajectory 4 and/or the actual vehicle trajectory 5. Thereby, provided that the further deviation exceedance criteria are fulfilled, data related to the planned vehicle trajectory 4 and/or the actual vehicle trajectory 5—such as for instance raw sensor data, perception output and/or decision control output associated with said time period T or a portion thereof—may be transmitted to the entity 9 e.g. for offline processing and/or analysis. The timing of transmittal may be arbitrarily selected as deemed feasible, such as e.g. promptly or at a point in time deemed suitable. The latter case may e.g. refer to awaiting a high bandwidth connection to the remote entity 9, such as e.g. a Wifi connection, and/or a wire connection provided via e.g. charging of the vehicle 2. The phrase "said further acknowledgment data comprising data reflecting said planned vehicle trajectory and/or said actual vehicle trajectory" may refer to "said further acknowledgment data comprising data, raw data and/or buffer data—applicable for at least a portion of said time period—reflecting and/or being associated with said planned vehicle trajectory and/or said actual vehicle trajectory".

Additionally or alternatively, optionally, the trajectory monitoring system 1 may then—e.g. by means of the further acknowledgment communicating unit 105—be adapted and/or configured for transmitting the further acknowledgment data 80 to an on-board AD/ADAS control system 22 adapted to control the ADAS or AD system 21, which further acknowledgment data 80 then comprises an indication to at least partly disable the ADAS or AD system 21. Thereby, provided that the further deviation exceedance criteria are fulfilled, the ADAS or AD system 21—and/or one or more features and/or components associated therewith—and/or functionality thereof, may be revoked to, at least temporarily, inhibit further activation(s), which for instance may be considered relevant should the further deviation exceedance criteria at least partly comprise one or more safety-related thresholds related to assumptions made on operation of the vehicle 2.

Additionally or alternatively, optionally, the trajectory monitoring system 1 may then—e.g. by means of the further acknowledgment communicating unit 105—be adapted and/or configured for transmitting the further acknowledgment data 80 to a user interface 23 of the vehicle 2, which further acknowledgment data 80 then comprises an indication to present to an occupant of the vehicle 2, information reflecting affected performance of the ADAS or AD system 21 pertinent the accuracy deviation measure 7 and/or fulfillment of the further deviation exceedance criteria. Thereby, provided that the further deviation exceedance criteria are fulfilled, instructions may be provided to a user interface 23 of the vehicle 2, for instance prompting an occupant of said vehicle 2—such as a driver thereof—to take appropriate action e.g. take over driving of the vehicle 2 from the ADAS or AD system 21, and/or notifying said occupant of affected performance of the ADAS or AD system 21. The phrase "said further acknowledgment data comprising an indication to present" may refer to "said further acknowledgment data prompting to present" and/or "said further acknowledgment data comprising instructions prompting to present", whereas "indication to present" may refer to "indication to in due time and/or when deemed feasible and/or safe present". Furthermore, the phrase "pertinent said accuracy deviation measure and/or fulfillment of said further deviation exceedance criteria" may refer to "resulting from the determination of said accuracy deviation measure and/or fulfillment of said further deviation exceedance criteria".

As further shown in FIG. 2, the trajectory monitoring system 1 comprises a planned trajectory determining unit 101, an actual trajectory determining unit 102, a deviation determining unit 103, an acknowledgment communicating unit 104, and an optional further acknowledgment communicating unit 105, all of which already have been described in greater detail above. Furthermore, the embodiments herein for assessment of a vehicle control system 211 of an ADAS or AD system 21 of a vehicle 2, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the trajectory monitoring system 1. One such carrier may be in the form of a CD ROM disc and/or a hard drive, it is however feasible with other data carriers. The computer program code may furthermore be provided as pure program code on a server and downloaded to the trajectory monitoring system 1. The trajectory monitoring system 1 may further comprise a memory 107 comprising one or more memory units. The memory 107 may be arranged to be used to store e.g., information, and further to store data, configurations, scheduling, and applications, to perform the methods herein when being executed in the trajectory monitoring system 1. For instance, the computer program code may be implemented in the firmware, stored in FLASH memory 107, of an embedded processor 106, and/or downloaded wirelessly e.g. from an off-board server. Furthermore, the planned trajectory determining unit 101, the actual trajectory determining unit 102, the deviation determining unit 103, the acknowledgment communicating unit 104, the optional further acknowledgment communicating unit 105, the optional processor 106 and/or the optional memory 107, may at least partly be comprised in one or more nodes 108 e.g., ECUs of the vehicle 2, e.g., in the ADAS or ADS system 21. Those skilled in the art will also appreciate that said units 101, 102, 103, 104, 105 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 107, that when executed by the one or more processors such as the processor 106 perform as described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 2 is the ADAS or AD system 21, the vehicle control system 211, the optional ADAS/AD control system 22, the optional user interface 23, the optional remote entity 9, the optional acknowledgment data 8 and the optional further acknowledgment data 80, all of which have been discussed in greater detail above.

Figure 3:
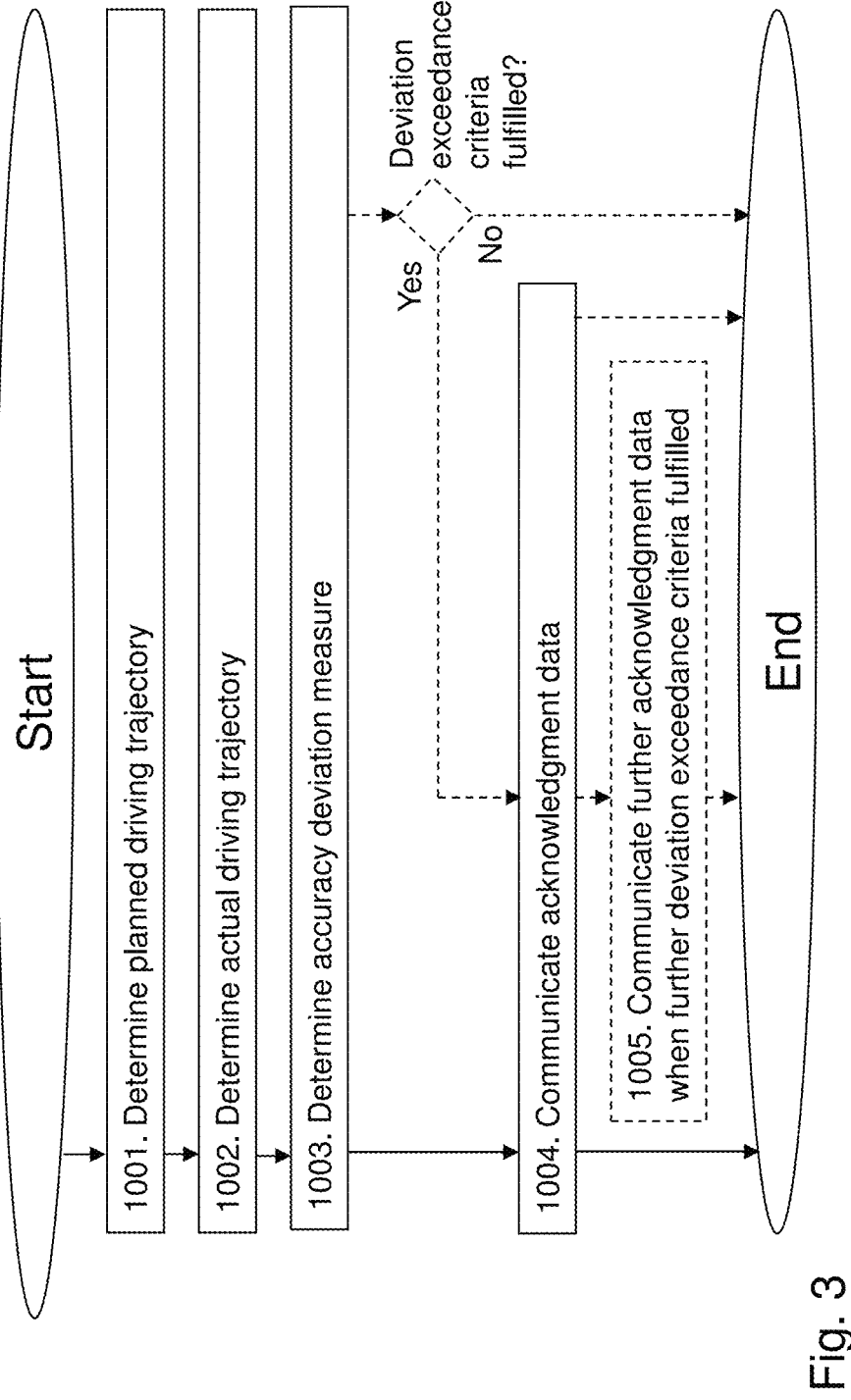
FIG. 3 is a flowchart depicting an exemplifying method performed by a trajectory monitoring system according to embodiments of the disclosure.

FIG. 3 is a flowchart depicting an exemplifying method performed by a trajectory monitoring system 1 according to embodiments of the disclosure. Said method is for 20 assessment of a vehicle control system 211 of an ADAS or AD system 21 of the vehicle 2. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Action 1002 and Action 1003 may be performed essentially simultaneously.

Action 1001

In Action 1001, the trajectory monitoring system 1 determines—e.g. with support from the planned trajectory determining unit 101—in view of a reference system 3, a planned vehicle trajectory 4 adapted to be executed by the vehicle control system 211 during a predeterminable time period T.

Action 1002

In Action 1002, the trajectory monitoring system 1 determines—e.g. with support from the actual trajectory determining unit 102—following initiation and/or completion of the time period T, an actual vehicle trajectory 5 of the vehicle 2 during the time period T in view of the reference system 3.

Action 1003

In Action 1003, the trajectory monitoring system 1 determines—e.g. with support from the deviation determining unit 103—an accuracy deviation measure 7 indicating deviation between the actual vehicle trajectory 5 and the planned vehicle trajectory 4.

Optionally, Action 1003 of determining an accuracy deviation measure 7 may be based on comparison of at least a first actual vehicle position 51 of the actual vehicle trajectory 5, at an at least first time point $t_1$, with at least a first planned vehicle position 41 of the planned vehicle trajectory 4 at the at least first time point $t_1$.

Action 1004

In Action 1004, the trajectory monitoring system 1 communicates—e.g. with support from the acknowledgment communicating unit 104—acknowledgment data 8 indicative of the accuracy deviation measure 7.

Optionally, Action 1004 of communicating acknowledgment data 8 may comprise communicating the acknowledgment data 8 when at least a portion of the accuracy deviation measure 7 fulfills deviation exceedance criteria.

Moreover optionally, Action 1004 of communicating acknowledgment data 8 may then comprise transmitting the acknowledgment data 8 to a remote entity 9, which acknowledgment data 8 then comprises data reflecting the planned vehicle trajectory 4 and/or the actual vehicle trajectory 5.

Additionally or alternatively, optionally, Action 1004 of communicating acknowledgment data 8 may then comprise transmitting the acknowledgment data 8 to an on-board AD/ADAS control system 22 adapted to control the ADAS or AD system 21, which acknowledgment data 8 then comprises an indication to at least partly disable the ADAS or AD system 21.

Moreover, additionally or alternatively, optionally, Action 1004 of communicating acknowledgment data 8 may then comprise transmitting the acknowledgment data 8 to a user interface 23 of the vehicle 2, which acknowledgment data 8 then comprises an indication to present to an occupant of the vehicle 2, information reflecting affected performance of the ADAS or AD system 21 pertinent the accuracy deviation measure 7 and/or fulfillment of the deviation exceedance criteria.

Action 1005

In optional Action 1005, the trajectory monitoring system 1 may communicate—e.g. with support from the optional further acknowledgment communicating unit 105—when at least a portion of the accuracy deviation measure 7 fulfills further deviation exceedance criteria, further acknowledgment data 80, wherein the deviation exceedance criteria differ from the further deviation exceedance criteria.

Optionally, Action 1005 of communicating further acknowledgment data 8 may then comprise transmitting the further acknowledgment data 80 to a remote entity 9, which further acknowledgment data 80 then comprises data reflecting the planned vehicle trajectory 4 and/or the actual vehicle trajectory 5.

Additionally or alternatively, optionally, Action 1005 of communicating further acknowledgment data 8 may then comprise transmitting the further acknowledgment data 80 to an on-board AD/ADAS control system 22 adapted to control the ADAS or AD system 21, which further acknowledgment data 80 then comprises an indication to at least partly disable the ADAS or AD system 21.

Moreover, additionally or alternatively, optionally, Action 1005 of communicating further acknowledgment data 80 may then comprise transmitting the further acknowledgment data 80 to a user interface 23 of the vehicle 2, which further acknowledgment data 80 then comprises an indication to present to an occupant of the vehicle 2, information reflecting affected performance of the ADAS or AD system 21 pertinent the accuracy deviation measure 7 and/or fulfillment of the further deviation exceedance criteria.

The person skilled in the art realizes that the present disclosure by no means is limited to the preferred embodiments described above. On the contrary, many modifications and variations are possible within the scope of the appended claims. It should furthermore be noted that the drawings not necessarily are to scale, and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a trajectory monitoring system of a vehicle for assessment of a vehicle control system of one of an advanced driver-assistance system, ADAS, and autonomous driving, AD, system of the vehicle, the method comprising:

determining in view of a reference system a planned vehicle trajectory adapted to be executed by the vehicle control system during a predeterminable time period;

determining following at least one of initiation and completion of the time period, an actual vehicle trajectory of the vehicle during the time period in view of the reference system, the actual vehicle trajectory being determined at least in part based on data received from an on-board vehicle perception system;

mapping, based on the reference system, the planned vehicle trajectory and the actual vehicle trajectory;

determining an accuracy deviation measure indicating deviation between the mapped actual vehicle trajectory and the mapped planned vehicle trajectory;

selecting a threshold level for a deviation exceedance criteria from a plurality of threshold levels by:

determining a criticality of the accuracy deviation measure, the criticality being based on a closeness of an object in a vicinity of the vehicle; and selecting the threshold level from the plurality of threshold levels based on the determined criticality of the accuracy deviation measure; and communicating acknowledgment data indicative of the accuracy deviation measure based on at least a portion of the accuracy deviation measure fulfilling the deviation exceedance criteria corresponding to the selected threshold level.

2. The method according to claim 1, wherein the determining an accuracy deviation measure is based on comparison of at least a first actual vehicle position of the actual vehicle trajectory, at an at least first time point $(t_1)$, with at least a first planned vehicle position of the planned vehicle trajectory at the at least first time point $(t_1)$.

3. The method according to claim 1, wherein the communicating acknowledgment data comprises at least one of:

transmitting the acknowledgment data to a remote entity, the acknowledgment data comprising data reflecting at least one of the planned vehicle trajectory and the actual vehicle trajectory; and transmitting the acknowledgment data to an on-board AD/ADAS control system adapted to control the one of the ADAS and AD system, the acknowledgment data comprising an indication to at least partly disable the ADAS or AD system.

4. The method according to claim 3, further comprising:

communicating, when at least a portion of the accuracy deviation measure fulfills further deviation exceedance criteria, further acknowledgment data, the deviation exceedance criteria differing from the further deviation exceedance criteria.

5. The method according to claim 1, further comprising:

communicating, when at least a portion of the accuracy deviation measure fulfills further deviation exceedance criteria, further acknowledgment data, the deviation exceedance criteria differing from the further deviation exceedance criteria.

6. The method according to claim 5, wherein the communicating further acknowledgment data comprises at least one of:

transmitting the further acknowledgment data to a remote entity, the further acknowledgment data comprising data reflecting the planned vehicle trajectory and/or the actual vehicle trajectory; and transmitting the further acknowledgment data to an on-board AD/ADAS control system adapted to control the ADAS or AD system, the further acknowledgment data comprising an indication to at least partly disable the ADAS or AD system.

7. A trajectory monitoring system of a vehicle for assessment of a vehicle control system of one of an advanced driver-assistance system, ADAS, and autonomous driving, AD, system of the vehicle, the trajectory monitoring system comprising:

a planned trajectory determining unit for:

determining in view of a reference system a planned vehicle trajectory adapted to be executed by the vehicle control system during a predeterminable time period, the actual vehicle trajectory being determined at least in part based on data received from an on-board vehicle perception system; and mapping, based on the reference system, the planned vehicle trajectory;

an actual trajectory determining unit for:

determining following initiation and/or completion of the time period, an actual vehicle trajectory of the vehicle during the time period in view of the reference system; and mapping, based on the reference system, the actual vehicle trajectory;

a deviation determining unit for determining an accuracy deviation measure indicating deviation between the mapped actual vehicle trajectory and the mapped planned vehicle trajectory and for selecting a threshold level for a deviation exceedance criteria from a plurality of threshold levels by:

determining a criticality of the accuracy deviation measure, the criticality being based on a closeness of an object in a vicinity of the vehicle; and selecting the threshold level from the plurality of threshold levels based on the determined criticality of the accuracy deviation measure; and an acknowledgment communicating unit for communicating acknowledgment data indicative of the accuracy deviation measure based on at least a portion of the accuracy deviation measure fulfilling the deviation exceedance criteria corresponding to the selected threshold level.

8. The trajectory monitoring system according to claim 7, wherein the deviation determining unit is configured to determine the accuracy deviation measure based on comparison of at least a first actual vehicle position of the actual vehicle trajectory, at an at least first time point $(t_1)$, with at least a first planned vehicle position of the planned vehicle trajectory at the at least first time point $(t_1)$.

9. The trajectory monitoring system according to claim 7, wherein the acknowledgment communicating unit is configured to at least one of:

transmit the acknowledgment data to a remote entity, the acknowledgment data comprising data reflecting at least one of the planned vehicle trajectory and the actual vehicle trajectory; and transmit the acknowledgment data to an on-board AD/ADAS control system configured to control the one of the ADAS and AD system, the acknowledgment data comprising an indication to at least partly disable the one of the ADAS and AD system.

10. The trajectory monitoring system according to claim 7, further comprising:

a further acknowledgment communicating unit for communicating, when at least a portion of the accuracy deviation measure fulfills further deviation exceedance criteria, further acknowledgment data, the deviation exceedance criteria differing from the further deviation exceedance criteria.

11. The trajectory monitoring system according to claim 9, further comprising:

a further acknowledgment communicating unit for communicating, when at least a portion of the accuracy deviation measure fulfills further deviation exceedance criteria, further acknowledgment data, the deviation exceedance criteria differing from the further deviation exceedance criteria.

12. The trajectory monitoring system according to claim 10, wherein the further acknowledgment communicating unit is configured to at least one of:

transmit the further acknowledgment data to a remote entity, the further acknowledgment data comprising data reflecting the planned vehicle trajectory and/or the actual vehicle trajectory; and transmit the further acknowledgment data to an on-board AD/ADAS control system configured to control the ADAS or AD system, the further acknowledgment data comprising an indication to at least partly disable the one of the ADAS and AD system.

13. The trajectory monitoring system according to claim 7, wherein the trajectory monitoring system is comprised in a vehicle.

14. A computer storage medium storing a computer program containing computer program code that when executed causes one of a computer and a processor to perform a method for assessment of a vehicle control system of one of an advanced driver-assistance system, ADAS, and autonomous driving, AD, system of the vehicle, the method comprising:

determining in view of a reference system a planned vehicle trajectory adapted to be executed by the vehicle control system during a predeterminable time period;

determining following at least one of initiation and completion of the time period, an actual vehicle trajectory of the vehicle during the time period in view of the reference system, the actual vehicle trajectory being determined at least in part based on data received from an on-board vehicle perception system;

mapping, based on the reference system, the planned vehicle trajectory and the actual vehicle trajectory;

determining an accuracy deviation measure indicating deviation between the mapped actual vehicle trajectory and the mapped planned vehicle trajectory;

selecting a threshold level for a deviation exceedance criteria from a plurality of threshold levels by:

determining a criticality of the accuracy deviation measure, the criticality being based on a closeness of an object in a vicinity of the vehicle; and selecting the threshold level from the plurality of threshold levels based on the determined criticality of the accuracy deviation measure; and communicating acknowledgment data indicative of the accuracy deviation measure based on at least a portion of the accuracy deviation measure fulfilling the deviation exceedance criteria corresponding to the selected threshold level.

15. The computer storage medium according to claim 14, wherein the determining an accuracy deviation measure is based on comparison of at least a first actual vehicle position of the actual vehicle trajectory, at an at least first time point (t1), with at least a first planned vehicle position of the planned vehicle trajectory at the at least first time point (t1).

\* \* \* \* \*